(12) United States Patent
Nam

(10) Patent No.: US 10,077,725 B2
(45) Date of Patent: Sep. 18, 2018

(54) APPARATUS AND METHOD FOR PURIFYING EXHAUST GAS

(71) Applicant: HYUNDAI MOTOR COMPANY, Seoul (KR)

(72) Inventor: Yoon Sang Nam, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 274 days.

(21) Appl. No.: 15/241,163

(22) Filed: Aug. 19, 2016

(65) Prior Publication Data

US 2017/0167417 A1 Jun. 15, 2017

(30) Foreign Application Priority Data

Dec. 11, 2015 (KR) ........................ 10-2015-0177469

(51) Int. Cl.
*F01N 11/00* (2006.01)
*F01N 13/00* (2010.01)
(Continued)

(52) U.S. Cl.
CPC ....... *F02D 41/0077* (2013.01); *F01N 3/0814* (2013.01); *F01N 3/0835* (2013.01); *F01N 3/101* (2013.01); *F01N 9/00* (2013.01); *F01N 11/002* (2013.01); *F01N 11/007* (2013.01); *F01N 13/008* (2013.01); *F02D 41/1441* (2013.01); *F02D 41/1446* (2013.01); *F02D 41/1454* (2013.01); *F02M 26/15* (2016.02); *F01N 2430/085* (2013.01); *F01N 2550/02* (2013.01); *F01N 2560/025* (2013.01); *F01N 2560/14* (2013.01); *F01N 2900/0408* (2013.01); *F01N 2900/1602* (2013.01); *F01N 2900/1626* (2013.01); *F02D 41/064* (2013.01); *F02D 41/1447* (2013.01); *Y02T 10/22* (2013.01); *Y02T 10/47* (2013.01)

(58) Field of Classification Search
CPC .... F01N 11/002; F01N 11/007; F01N 13/008; F01N 3/0814; F01N 3/0835; F01N 3/101; F01N 9/00; F01N 2430/085; F01N 2550/02; F01N 2560/025; F01N 2560/14; F01N 2900/0408; F01N 2900/1602; F01N 2900/1626; F02D 41/0077; F02D 41/1441; F02D 41/1446; F02D 41/1454; F02D 41/064; F02D 41/1447; F02M 26/15; Y02T 10/22; Y02T 10/47
See application file for complete search history.

(56) References Cited

FOREIGN PATENT DOCUMENTS

| JP | H07-091238 A | 4/1995 |
|---|---|---|
| JP | 10-212979 A | 8/1998 |

(Continued)

*Primary Examiner* — Brandon Lee
(74) *Attorney, Agent, or Firm* — Brinks Gilson & Lione

(57) ABSTRACT

An apparatus and a method of purifying exhaust gas are provided. The apparatus for purifying exhaust gas may include: an exhaust pipe connected to an exhaust manifold of an engine; a catalytic converter mounted on the exhaust pipe and including a hydrocarbon trap and a three-way catalyst; an exhaust gas recirculation (EGR) pipe connecting downstream of the catalytic converter to an intake manifold of the engine; an EGR valve mounted on the EGR pipe; a first oxygen sensor mounted on the exhaust pipe downstream of the catalytic converter; a second oxygen sensor mounted on the exhaust pipe upstream of the catalytic converter; and a controller controlling an operation of the EGR valve.

16 Claims, 4 Drawing Sheets

(51) Int. Cl.
  *F01N 3/08* (2006.01)
  *F01N 3/10* (2006.01)
  *F02D 41/00* (2006.01)
  *F02M 26/15* (2016.01)
  *F01N 9/00* (2006.01)
  *F02D 41/14* (2006.01)
  F02D 41/06 (2006.01)

(56) References Cited

FOREIGN PATENT DOCUMENTS

| | | | |
|---|---|---|---|
| JP | 2000-257479 | A | 9/2000 |
| JP | 2002-285833 | A | 10/2002 |
| JP | 5518234 | B1 | 4/2014 |
| KR | 10-0535409 | B1 | 12/2005 |

APPARATUS AND METHOD FOR PURIFYING EXHAUST GAS

CROSS-REFERENCE TO RELATED APPLICATION

This application claims priority to and the benefit of Korean Patent Application No. 10-2015-0177469, filed on Dec. 11, 2015, which is incorporated herein by reference in its entirety.

FIELD

The present disclosure relates to a system and method for purifying exhaust gas.

BACKGROUND

The statements in this section merely provide background information related to the present disclosure and may not constitute prior art.

Energy generated by burning fossil fuel is converted into kinetic energy to drive a vehicle. Exhaust gas is generated in a combustion process of the fossil fuel, and harmful materials of the exhaust gas are purified. After that, the exhaust gas is exhausted into the atmosphere through an exhaust pipe.

An exhaust system of a vehicle may include a three-way catalyst for purifying harmful materials contained in exhaust gas. Recently, technology for mounting an additional catalytic converter in addition to a three-way catalyst has been under development.

Even though the additional catalytic converter is mounted on the exhaust pipe, it is difficult to remove harmful materials contained in the exhaust gas until a temperature of the exhaust gas reaches a light-off temperature of the catalyst in a case of cold starting where the temperature of the exhaust gas is very low. Particularly, a material such as a hydrocarbon is largely generated at initial starting, but hydrocarbons largely generated at the initial starting are not appropriately purified at the catalytic converter.

FIG. 4 is a graph illustrating a change in hydrocarbon concentration according to a conventional method of purifying exhaust gas.

As shown in FIG. 4, in a case where a hydrocarbon trap is used, hydrocarbons which cannot be purified at initial starting are inhibited from being exhausted to the exterior of the vehicle. However, since the hydrocarbons adsorbed in the hydrocarbon trap are started to be released before the temperature of the exhaust gas reaches a light-off temperature of a catalyst, purifying efficiency of the exhaust gas may be deteriorated.

SUMMARY

The present disclosure provides an apparatus and a method for purifying exhaust gas having advantages of efficiently removing hydrocarbons contained in the exhaust gas using oxygen sensors mounted on an exhaust pipe downstream and upstream of a catalytic converter and an exhaust gas recirculation (EGR) valve mounted on an EGR pipe.

An apparatus for purifying an exhaust gas according to one form of the present disclosure may include: an exhaust pipe connected to an exhaust manifold of an engine; a catalytic converter mounted on the exhaust pipe and including a hydrocarbon trap and a three-way catalyst; an exhaust gas recirculation (EGR) pipe connecting downstream of the catalytic converter to an intake manifold of the engine; an EGR valve mounted on the EGR pipe; a first oxygen sensor mounted on the exhaust pipe downstream of the catalytic converter; a second oxygen sensor mounted on the exhaust pipe upstream of the catalytic converter; and a controller controlling operation of the EGR valve. In particular, the controller may compare a difference value between a first measured value of the first oxygen sensor and a second measured value of the second oxygen sensor with a predetermined value, may also compare a temperature of the exhaust gas flowing into the catalytic converter with a predetermined temperature when the difference value is less than the predetermined value. The controller may open the EGR valve when the temperature of the exhaust gas is less than the predetermined temperature.

The controller may close the EGR valve when the difference value is greater than or equal to the predetermined value.

The controller may close the EGR valve when the temperature of the exhaust gas is greater than or equal to the predetermined temperature.

The hydrocarbon may be coated on a carrier and the three-way catalyst may be coated on the hydrocarbon trap.

The controller may calculate the temperature of the exhaust gas flowing into the catalytic converter based on a speed of the engine, a fuel amount injected by an injector, an air amount flowing into a combustion chamber, ignition timing, and heat capacity of the exhaust pipe.

The apparatus may further include a temperature sensor measuring the temperature of the exhaust gas flowing into the catalytic converter.

The engine may be any one of a gasoline direct injection (GDI) engine, a multi-point injection (MPI) engine, and a diesel engine.

A method of purifying exhaust gas according to another form of the present disclosure may include: receiving a first measured value of a first oxygen sensor mounted on an exhaust pipe downstream of a catalytic converter and a second measured value of a second oxygen sensor mounted on the exhaust pipe upstream of the catalytic converter; calculating a difference value between the first measured value and the second measured value; comparing the difference value with a predetermined value; comparing the temperature of exhaust gas with a predetermined temperature when the difference value is less than the predetermined value; and opening an exhaust gas recirculation (EGR) valve mounted on an EGR pipe connecting the exhaust pipe downstream of the catalytic converter to an intake manifold of an engine when the temperature of the exhaust gas is less than the predetermined temperature.

The method may further include closing the EGR valve when the difference value is greater than or equal to the predetermined value.

The method may further include closing the EGR valve when the temperature of the exhaust gas is greater than or equal to the predetermined temperature.

The catalytic converter may include a hydrocarbon trap adsorbing or releasing hydrocarbon depending on the temperature of the exhaust gas, and a three-way catalyst converting harmful material including carbon monoxide, hydrocarbon, and nitrogen oxide contained in the exhaust gas into a harmless material through an oxidation-reduction reaction.

The temperature of the exhaust gas may be calculated based on a speed of the engine, a fuel amount injected by an injector, an air amount flowing into a combustion chamber, ignition timing, and heat capacity of the exhaust pipe.

The temperature of the exhaust gas may be measured by a temperature sensor mounted on the exhaust pipe upstream of the catalytic converter.

The engine may be any one of a gasoline direct injection (GDI) engine, a multi-point injection (MPI) engine, and a diesel engine.

According to one form of the present disclosure, the exhaust gas is supplied back to the engine through the EGR pipe while hydrocarbon adsorbed in the hydrocarbon trap is released, thereby improving purifying efficiency of the exhaust gas.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
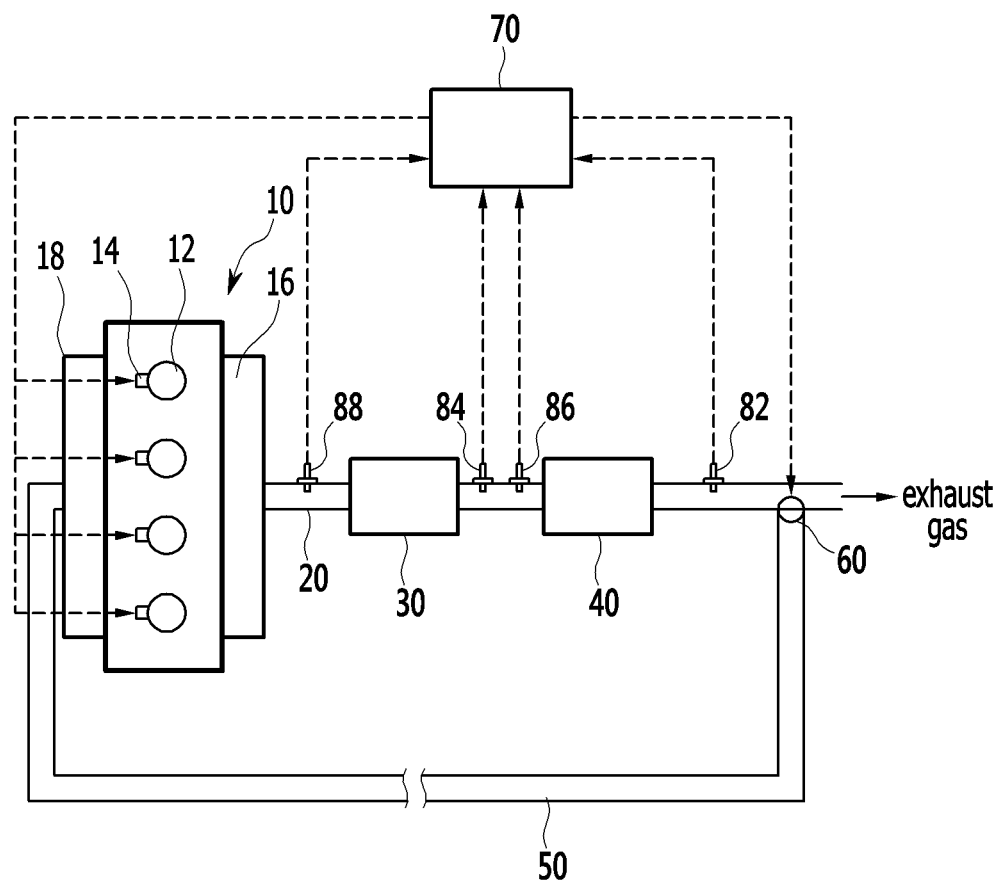
FIG. 1 is a diagram of an apparatus for purifying exhaust gas according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Parts which are not related with the description are omitted for clearly describing the exemplary form of the present disclosure.

Since each component shown in the drawings is arbitrarily illustrated for easy description, the present is not particularly limited to the components illustrated in the drawings.

As shown in FIG. 1, an apparatus for purifying exhaust gas according to one form of the present disclosure includes: an engine 10, an exhaust pipe 20, a first three-way catalyst 30, a catalytic converter 40, an exhaust gas recirculation (EGR) pipe 50, an EGR valve 60, and a controller 70.

The engine 10 burns fuel and air to convert chemical energy into mechanical energy. The engine 10 is connected to an intake manifold 18 so as to receive the air in a combustion chamber 12, and exhaust gas generated in a combustion process is gathered in an exhaust manifold 16 and is exhausted to the exterior of the engine 10. An injector 14 is mounted in the combustion chamber 12 to inject the fuel into the combustion chamber 12. A gasoline direct injection (GDI) engine is exemplified in this specification, but the present disclosure is not limited to the GDI engine. If a multi-point injection (MPI) engine is used, the injector 14 is mounted at the intake manifold 18 or an intake pipe to inject the fuel. In addition, if a diesel engine is used, the injector 12 is mounted in the combustion chamber 12.

The exhaust pipe 20 is connected to the exhaust manifold 16 to exhaust the exhaust gas to the exterior of a vehicle. The first three-way catalyst 30 and the catalytic converter 40 are mounted on the exhaust pipe 20 and remove hydrocarbons, carbon monoxide, and nitrogen oxide contained in the exhaust gas.

The first three-way catalyst 30 is mounted on the exhaust pipe 20 downstream of the engine 10, and removes harmful materials contained in the exhaust gas exhausted from the engine 10 through an oxidation-reduction reaction. Generally, the first three-way catalyst 30 converts three harmful materials (CO, HC, and NOx) contained in the exhaust gas into harmless gas ($CO_2$, $H_2O$, and $N_2$) through the oxidation-reduction reaction. The first three-way catalyst 30 is provided with an oxygen-storing material such as ceria, an oxidation catalyst such as palladium and platinum, and a reduction catalyst such as rhodium coated thereon. Since the three-way catalyst is well known to a person of ordinary skill in the art, detailed description thereof will be omitted.

The catalytic converter 40 is mounted on the exhaust pipe 20 downstream of the first three-way catalyst 30. The catalytic converter 40 is configured to remove hydrocarbons, carbon monoxide, and nitrogen oxide remaining in the exhaust gas that has passed through the first three-way catalyst 30.

Figure 2:
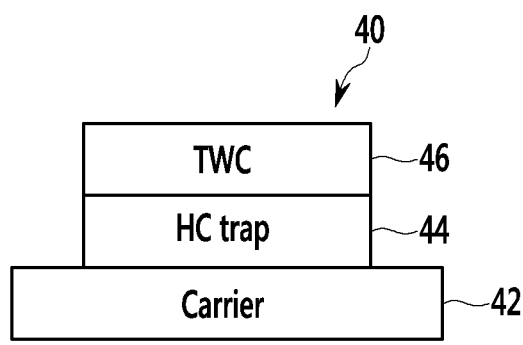
FIG. 2 is a diagram of a catalytic converter according to the present disclosure.

As shown in FIG. 2, the catalytic converter 40 may include a carrier 42, a hydrocarbon trap 44, and a second three-way catalyst 46.

The carrier 42 forms a mold of the catalytic converter 40, and a plurality of channels through which the exhaust gas flows are formed by the carrier 42. The carrier 42 may be made of alumina.

The hydrocarbon trap 44 is coated on the carrier 42. The hydrocarbon trap 44 may be made of beta-zeolite, A-type zeolite, X-type zeolite, ZSM-5, USY, and the like. The hydrocarbon trap 44 adsorbs hydrocarbons contained in the exhaust gas when the temperature of the exhaust gas is low (e.g., lower than or equal to about 150° C.), and releases the adsorbed hydrocarbons when the temperature of the exhaust gas is high. In other words, when the first three-way catalyst 30 and the second three-way catalyst 46 are not activated because of low temperature of the exhaust gas (e.g., initial starting of the engine), the hydrocarbon trap 44 traps hydrocarbons contained in the exhaust gas. Therefore, hydrocarbons which cannot be purified at initial starting are inhibited from being exhausted to the exterior of the vehicle. When the temperature of the exhaust gas reaches about 300° C., almost all hydrocarbons adsorbed in the hydrocarbon trap 44 may be released. A light-off temperature (activation temperature) of the first three-way catalyst 30 and the second three-way catalyst 46 may be about 350° C. The light-off temperature means a temperature of exhaust gas at which 50% of each harmful material contained in the exhaust gas is converted by a catalyst.

The second three-way catalyst 46 is coated on the hydrocarbon trap 44. The second three-way catalyst 46, similar to the first three-way catalyst 30, converts three harmful materials (Co, HC, and NOx) contained in the exhaust gas into harmless gas ($CO_2$, $H_2O$, and $N_2$) through the oxidation-reduction reaction. The second three-way catalyst 46 is provided with an oxygen-storing material such as ceria, an oxidation catalyst such as palladium and platinum, and a reduction catalyst such as rhodium coated thereon. Since the three-way catalyst is well known to a person of ordinary skill in the art, detailed description thereof will be omitted.

The EGR pipe 50 connects the exhaust pipe 20 downstream of the catalytic converter 40 to the intake manifold 18 of the engine 10. A portion of the exhaust gas exhausted from the catalytic converter 40 is supplied back to the engine 10 through the EGR pipe 50.

The EGR valve 60 is mounted on the EGR pipe 50. If the EGR valve 60 is opened, a portion of the exhaust gas exhausted from the catalytic converter 40 is supplied back to the engine 10 through the EGR pipe 50. If the EGR valve 60 is closed, the exhaust gas exhausted from the catalytic converter 40 is not supplied back to the engine 10 through the EGR pipe 50.

A first oxygen sensor 82 may be mounted on the exhaust pipe 20 downstream of the catalytic converter 40. The first oxygen sensor 82 measures an oxygen amount contained in the exhaust gas exhausted from the catalytic converter 40 and transmits a signal corresponding thereto to the controller 70. The measured value (hereinafter, referred to as a first measured value) by the first oxygen sensor 82 may be represented as lambda ($\lambda_1$). The lambda means a ratio of actual air/fuel ratio to a stoichiometric air/fuel ratio. If the lambda is greater than 1, the air/fuel ratio is lean. On the contrary, the air/fuel ratio is rich if the lambda is less than 1.

A second oxygen sensor 84 is mounted on the exhaust pipe 20 upstream of the catalytic converter 40. The second oxygen sensor 84 measures an oxygen amount contained in the exhaust gas flowing into the catalytic converter 40 and transmits a signal corresponding thereto to the controller 70. The measured value (hereinafter, referred to as a second measured value) by the second oxygen sensor 84 may be represented as lambda ($\lambda_1$).

A temperature sensor 86 may be mounted on the exhaust pipe 20 upstream of the catalytic converter 40. The temperature sensor 86 measures temperature of the exhaust gas flowing into the catalytic converter 40 and transmits a signal corresponding thereto to the controller 70. The controller 70 may determine whether hydrocarbons adsorbed in the hydrocarbon trap 44 are released based on the value measured by the temperature sensor 86.

In one form, the controller 70 may calculate the temperature of the exhaust gas flowing into the catalytic converter 40 based on a speed of the engine 10, a fuel amount injected by the injector 14, an air amount flowing into the combustion chamber 12, ignition timing, and/or heat capacity of the exhaust pipe 20. The heat capacity of the exhaust pipe 20 may be set depending on the material of the exhaust pipe 20.

A third oxygen sensor 88 is mounted between the engine 10 and the first three-way catalyst 30. The third oxygen sensor 88 measures an oxygen amount contained in the exhaust gas exhausted from the engine 10 and transmits a signal corresponding thereto to the controller 70. The controller 70 may perform lean/rich control of the exhaust gas based on the measured values of the first, second, and third oxygen sensors 82, 84, and 88. The lean/rich control may be performed by controlling the fuel amount injected by the injector 14.

The controller 70 may determine a state of the catalytic converter 40 based on the first measured value of the first oxygen sensor 82, the second measured value of the second oxygen sensor 84, and the temperature of the exhaust gas flowing into the catalytic converter 40, and may control the EGR valve 50 based on the state of the catalytic converter 40. For these purposes, the controller 70 may be implemented with one or more processors executed by a predetermined program, and the predetermined program may be programmed to perform each step included in a method of purifying exhaust gas according to the present disclosure.

Hereinafter, a method of purifying exhaust gas according to one form of the present disclosure will be described in detail with reference to FIG. 3.

Figure 3:
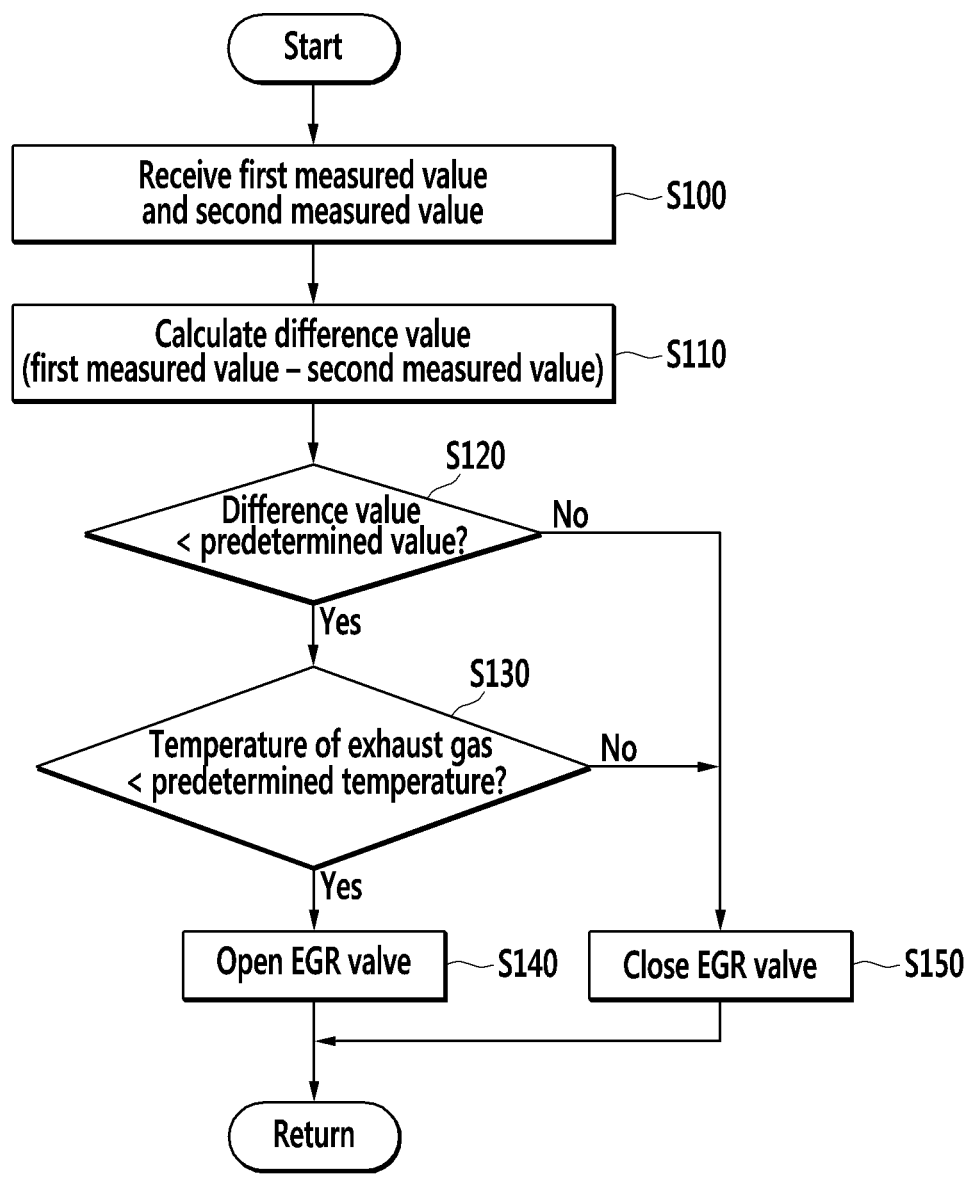
FIG. 3 is a flowchart of a method of purifying exhaust gas according to the present disclosure.
Figure 4:
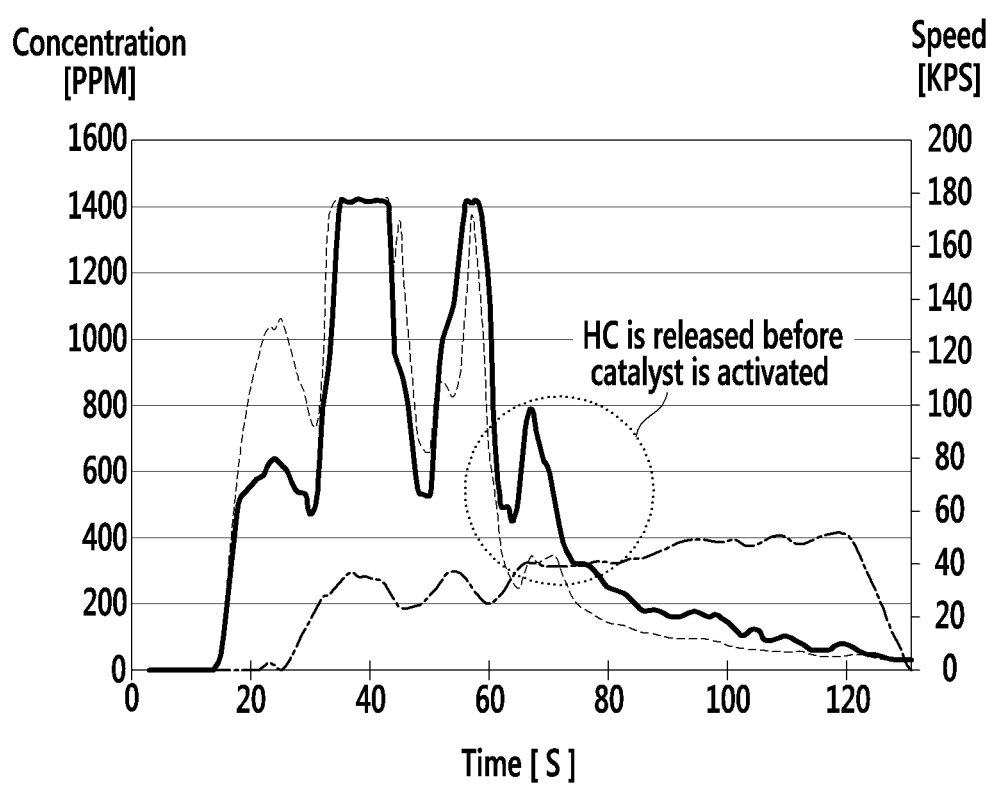
FIG. 4 is a graph illustrating a change in hydrocarbon concentration according to a conventional method of purifying exhaust gas.

As shown in FIG. 3, a method of purifying exhaust gas is performed when the engine 10 is driven.

The controller 70 receives the first measured value of the first oxygen sensor 82 and the second measured value of the second oxygen sensor 84 at step S100. The controller 70 may determine the temperature of the exhaust gas flowing into the catalytic converter 40. The temperature of the exhaust gas may be calculated based on the speed of the engine 10, the fuel amount injected by the injector 14, the air amount flowing into the combustion chamber 12, the ignition timing, and/or the heat capacity of the exhaust pipe 20. In another form, the temperature of the exhaust gas may be measured by the temperature sensor 86. In this case, the controller 70 may accurately determine the temperature of the exhaust gas.

The controller 70 calculates a difference value between the first measured value and the second measured value at step S110. Specifically, the controller 70 may calculate the difference value by subtracting the second measured value from the first measured value.

The controller 70 compares the difference value with a predetermined value at step S120. The predetermined value may be set to a value which is determined by a person of ordinary skill in the art to determine whether the hydrocarbon adsorbed in the hydrocarbon trap 44 is started to be released.

When the difference value is less than the predetermined value at step S120, the controller 70 compares the temperature of the exhaust gas with a predetermined temperature at step S130. The predetermined temperature may be set to a temperature which is determined by a person of ordinary skill in the art in consideration of a temperature at which all hydrocarbons adsorbed in the hydrocarbon trap 44 are released.

When the temperature of the exhaust gas is less than the predetermined temperature at step S130, the controller 70 opens the EGR valve 60 at step S140. Accordingly, the exhaust gas in a rich atmosphere exhausted from the catalytic converter 40 may be supplied back to the engine 10. In addition, when the EGR valve 60 is opened, the controller 70 may calculate a pressure of the exhaust gas supplied to the engine 10 through the EGR pipe 50 by using an ideal gas equation based on the temperature of the exhaust gas. The controller 70 may control the operation of the engine 10 considering the temperature and the pressure of the exhaust gas supplied to the engine 10.

Meanwhile, when the difference value is greater than or equal to the predetermined value at step S120, the controller 70 closes the EGR valve 60 at step S150. In addition, when the temperature of the exhaust gas is greater than or equal to the predetermined temperature at step S130, the controller 70 closes the EGR valve 60. Accordingly, purified exhaust gas may be exhausted to the exterior of the vehicle through the exhaust pipe 20.

As described above, the exhaust gas is supplied back to the engine 10 through the EGR pipe 50 while hydrocarbons adsorbed in the hydrocarbon trap 44 are released, thereby improving purifying efficiency of the exhaust gas.

While this present disclosure has been described in connection with what is presently considered to be practical exemplary forms, it is to be understood that the present disclosure is not limited to the disclosed forms, but, on the

| | <Description of symbols> | |
|---|---|
| 10: engine | 12: combustion chamber |
| 14: injector | 16: exhaust manifold |
| 18: intake manifold | 20: exhaust pipe |
| 30: first three-way catalyst | 40: catalytic converter |
| 50: EGR pipe | 60: EGR valve |
| 70: controller | 82: first oxygen sensor |
| 84: second oxygen sensor | 86: temperature sensor |
| 88: third oxygen sensor | |

What is claimed is:

1. An apparatus for purifying exhaust gas, comprising:
an exhaust pipe connected to an exhaust manifold of an engine;
a catalytic converter mounted on the exhaust pipe and including a hydrocarbon trap and a three-way catalyst;
an exhaust gas recirculation (EGR) pipe connecting downstream of the catalytic converter to an intake manifold of the engine;
an EGR valve mounted on the EGR pipe;
a first oxygen sensor mounted on the exhaust pipe downstream of the catalytic converter;
a second oxygen sensor mounted on the exhaust pipe upstream of the catalytic converter; and
a controller configured to control an operation of the EGR valve,
wherein the controller is configured to compare a difference value between a first measured value of the first oxygen sensor and a second measured value of the second oxygen sensor with a predetermined value, compare a temperature of the exhaust gas flowing into the catalytic converter with a predetermined temperature when the difference value is less than the predetermined value, and open the EGR valve when the temperature of the exhaust gas is less than the predetermined temperature.

2. The apparatus of claim 1, wherein the controller is configured to close the EGR valve when the difference value is greater than or equal to the predetermined value.

3. The apparatus of claim 1, wherein the controller is configured to close the EGR valve when the temperature of the exhaust gas is greater than or equal to the predetermined temperature.

4. The apparatus of claim 1, wherein the hydrocarbon trap is coated on a carrier and the three-way catalyst is coated on the hydrocarbon trap.

5. The apparatus of claim 4, wherein the carrier forms a mold of the catalytic converter and a plurality of channels through which the exhaust gas flows.

6. The apparatus of claim 4, wherein when the three-way catalyst is not activated at a low temperature of the exhaust gas, the hydrocarbon trap is configured to trap hydrocarbons contained in the exhaust gas.

7. The apparatus of claim 1, wherein the controller is configured to calculate the temperature of the exhaust gas flowing into the catalytic converter based on a speed of the engine, a fuel amount injected by an injector, an air amount flowing into a combustion chamber, ignition timing, and heat capacity of the exhaust pipe.

8. The apparatus of claim 1, further comprising a temperature sensor configured to measure the temperature of the exhaust gas flowing into the catalytic converter.

9. The apparatus of claim 1, wherein the engine is any one of a gasoline direct injection (GDI) engine, a multi-point injection (MPI) engine, and a diesel engine.

10. A method of purifying exhaust gas, comprising:
receiving a first measured value of a first oxygen sensor mounted on an exhaust pipe downstream of a catalytic converter and a second measured value of a second oxygen sensor mounted on the exhaust pipe upstream of the catalytic converter;
calculating a difference value between the first measured value and the second measured value;
comparing the difference value with a predetermined value;
comparing a temperature of exhaust gas with a predetermined temperature when the difference value is less than the predetermined value; and
opening an exhaust gas recirculation (EGR) valve mounted on an EGR pipe connecting the exhaust pipe downstream of the catalytic converter to an intake manifold of an engine when the temperature of the exhaust gas is less than the predetermined temperature.

11. The method of claim 10, further comprising closing the EGR valve when the difference value is greater than or equal to the predetermined value.

12. The method of claim 10, further comprising closing the EGR valve when the temperature of the exhaust gas is greater than or equal to the predetermined temperature.

13. The method of claim 10, wherein the catalytic converter comprises:
a hydrocarbon trap configured to adsorb or release hydrocarbons depending on the temperature of the exhaust gas; and
a three-way catalyst configured to convert harmful materials including carbon monoxide, hydrocarbons, and nitrogen oxide contained in the exhaust gas into harmless materials through an oxidation-reduction reaction.

14. The method of claim 10, wherein the temperature of the exhaust gas is calculated based on a speed of the engine, a fuel amount injected by an injector, an air amount flowing into a combustion chamber, ignition timing, and heat capacity of the exhaust pipe.

15. The method of claim 10, wherein the temperature of the exhaust gas is measured by a temperature sensor mounted on the exhaust pipe upstream of the catalytic converter.

16. The method of claim 10, wherein the engine is any one of a gasoline direct injection (GDI) engine, a multi-point injection (MPI) engine, and a diesel engine.

* * * * *